United States Patent
Friedreich

(10) Patent No.: US 6,496,645 B1
(45) Date of Patent: Dec. 17, 2002

(54) VIDEO RECORDER HAVING PLAYBACK-SIGNAL PROCESSING MEANS ADAPTABLE TO DIFFERENT PLAYBACK QUALITIES OF VIDEO RECORDINGS

(75) Inventor: Willibald Friedreich, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/131,439

(22) Filed: Aug. 10, 1998

(30) Foreign Application Priority Data

Aug. 14, 1997 (EP) .............................................. 97890162

(51) Int. Cl.[7] ................................................ H04N 7/79
(52) U.S. Cl. ........................ 386/21; 386/114; 348/606; 348/607; 348/625
(58) Field of Search .............................. 386/21, 114, 46, 386/25; 348/607, 622, 606, 625, 627, 666, 553–557, 645, 533, 535; H04N 7/79

(56) References Cited

U.S. PATENT DOCUMENTS

| | | | |
|---|---|---|---|
| 4,763,186 A | * 8/1988 | Belmares-Sarabia et al. | 348/645 |
| 5,072,299 A | * 12/1991 | Park | 348/625 |
| 5,237,417 A | * 8/1993 | Hayashi et al. | 348/565 |
| 5,249,064 A | 9/1993 | Minakawa | |
| 5,257,109 A | * 10/1993 | Minakawa | 386/21 |
| 5,294,979 A | * 3/1994 | Patel et al. | 348/533 |
| 5,298,982 A | * 3/1994 | Lagoni | 348/607 |
| 5,299,002 A | * 3/1994 | Funnayama | 348/607 |
| 5,400,149 A | 3/1995 | Minakawa | |
| 5,416,641 A | 5/1995 | Minakawa | |
| 5,446,539 A | 8/1995 | Minakawa | |
| 5,543,926 A | * 8/1996 | Ezaki | 348/607 |

FOREIGN PATENT DOCUMENTS

| | | | |
|---|---|---|---|
| EP | 0464772 B1 | 1/1992 | |
| EP | 0464772 A2 | 1/1992 | ............ H04N/5/92 |
| EP | 0516463 A2 | 12/1992 | ............ H04N/5/21 |

* cited by examiner

Primary Examiner—Vincent Boccio
(74) Attorney, Agent, or Firm—Edward W. Goodman

(57) ABSTRACT

A video recorder for playing video recordings recorded on magnetic tapes, these recordings being available with different playback qualities, and including a reproduction apparatus for scanning a magnetic tape and for supplying a playback signal; and a playback-signal processing apparatus for processing the playback signal and including at least one controllable signal-influencing stage for controllably influencing at least one component (luminance signal Y) of the playback signal, and an entry device for cooperating with the video recorder and providing entry of characteristic information which characterizes different playback qualities of video recordings; and a control apparatus for generating control information corresponding to the characteristic information. The at least one controllable signal-influencing stage is controlled depending on the control information.

6 Claims, 1 Drawing Sheet

VIDEO RECORDER HAVING PLAYBACK-SIGNAL PROCESSING MEANS ADAPTABLE TO DIFFERENT PLAYBACK QUALITIES OF VIDEO RECORDINGS

BACKGROUND OF THE INVENTION

1. Field of the Invention

The invention relates to a video recorder for the reproduction of video recordings recorded on magnetic tapes, these recordings being available with different playback qualities, comprising reproduction means for scanning a magnetic tape and for supplying a playback signal representing a video recording, and playback-signal processing means for processing the playback signal and including at least one controllable signal-influencing stage for controllably influencing at least one component of the playback signal.

2. Description of the Related Art

Such a video recorder of the type defined in the opening paragraph is known, for example, from European Patent Specification EP 0 464 772 B1, corresponding to U.S. Pat. No. 5,257,109, and divisional U.S. Pat. No. 5,249,064, 5,400,149, 5,416,641 and 5,446,539. In this known video recorder, the playback-signal processing means comprises several signal-influencing stages, such as an FM equalizer stage, a peaking stage, a horizontal noise cancellation stage and a vertical noise cancellation stage, which are controllable with the aid of control means so as to change their signal-influencing qualities, the control means controlling said stages in dependence upon the characteristics of different magnetic tapes, thereby enabling said stages to be adapted to different characteristics or properties of different magnetic tapes in order to achieve an optimum reproduction of video recordings made on magnetic tapes having different properties. By means of the known video recorder, it is possible to achieve a correct reproduction of video recordings from magnetic tapes having different characteristics or properties. However, apart from this advantageous feature, this known video recorder has a limitation as a result of which a wholly satisfactory reproduction of video recordings is not guaranteed in some cases.

SUMMARY OF THE INVENTION

It is an object of the invention to avoid the aforementioned limitation and to provide an improved video recorder of the type defined in the opening paragraph. To this end, according to the invention, a video recorder of the type defined in the opening paragraph is characterized in that there have been provided entry means which cooperates with the video recorder and which is adapted to enter characteristic information which characterizes different playback qualities of video recordings, and the video recorder includes control means arranged to receive the characteristic information and adapted to generate control information corresponding to the characteristic information, and the at least one controllable signal-influencing stage is adapted to be controlled in respect of its controllable influencing of at least one component of the playback signal in dependence upon the control information generated by the control means. Thus, it is achieved with simple means and with only a very small additional expenditure, that the at least one controllable signal-influencing stage for controllably influencing a playback signal can be adapted to different playback qualities of video recordings in an easy manner, and in accordance with the wishes and requirements of a user of the video recorder, by the playback-signal processing means which includes said stage. In principle, the different playback qualities of video recordings are determined by the relevant program material, i.e., whether it is a video recording which has never been played before, or a video recording which has been played very frequently, for example, a rental cassette, or a video recording in the form of an animated cartoon, or a studio-quality video recording made in a studio by high-quality video cameras, or a lower quality but very up-to-date reporter's video recording made by a portable camera, or a sports video recording. When a user introduces a magnetic tape, which for this purpose is accommodated in a cassette, into a video recorder in accordance with the invention, the user practically always knows the playback quality of the video recording made on the introduced magnetic tape, as a result of which, the user can select a setting corresponding to this playback quality for the at least one controllable signal-influencing stage of the playback-signal processing means with the aid the entry means, after which the control means included in the video recorder automatically controls the at least one controllable signal-influencing stage of the playback-signal processing means in accordance with the user's wishes.

In a video recorder in accordance with the invention having the characteristic features described above, it has proven to be advantageous, in addition, that the playback-signal processing means includes a plurality of controllable signal-influencing stages for controllably influencing at least one component of the playback signal, and all the controllable signal-influencing stages are controllable in dependence upon control information generated by the control means. In this way, it is achieved that by merely entering characteristic information using the entry means, the user of the video recorder can simply and particularly reliably control a plurality of signal-influencing stages for an optimum reproduction of a video recording having a given playback quality and set these stages to the best possible influencing mode.

In such a video recorder in accordance with the invention, it has proven to be very advantageous, in addition, that the video recorder further comprises input means for receiving the control information generated by the control means, and for deriving stage control information corresponding to the control information, the stage control information being applied to the signal-influencing stages for controlling the manner in which the signal-influencing stages influence the at least one component of the playback signal. Tests have proven that such an embodiment is particularly advantageous for controlling a plurality of signal-influencing stages in an as simple and reliable as possible manner.

In such a video recorder in accordance with the invention, it has prove to be very advantageous, in addition, that the playback-signal processing means includes an FM equalizer stage, a vertical noise-cancellation stage, a first horizontal noise-cancellation stage, a second horizontal noise-cancellation stage, and a picture-sharpness control stage, wherein each of these five signal-influencing stages receives stage control information via the input means. With such an embodiment, the signal-influencing stages in the playback-signal processing means can be adapted to different playback qualities of video recordings in a particularly suitable and differentiated manner.

In such a video recorder in accordance with the invention, it has proven to be particularly advantageous, in addition, that the five signal-influencing stages are realized in an integrated device connected to the control means via a bus line forming part of the input means. This is particularly advantageous for a simple construction and for a simple and faultless control of the controllable signal-influencing stages.

In a video recorder in accordance with the invention having the characteristic features described above, it has further proven to be very advantageous, in addition, that the entry means enters first characteristic information characterizing the playback quality of a video recording being played for the first time or having been played only a few times, and second characteristic information characterizing the playback quality of a video recording having already been played many times. In this way, it is achieved that the user can simply adapt the at least one controllable signal-influencing stage in the playback-signal processing means to the playback quality of a video recording which is played for the first time or which has been played only a few times, as well as to the playback quality of a video recording which has already been played many times, as, for example, recorded on the magnetic tape of a so-called rental cassette.

In such a video recorder in accordance with the invention, it has proven to be very advantageous, in addition, that the entry means, in addition, enters third characteristic information representing the playback quality of a video recording of an animation film. Such an embodiment, in addition, enables the at least one controllable signal-influencing stage in the playback-signal processing means to be adapted to the playback quality of a video recording representing a trick film.

In such a video recorder in accordance with the invention, it has proven to be very advantageous, in addition, that the entry means, in addition, enters at least one further item of characteristic information. In this way, the at least one controllable signal-influencing stage in the playback-signal processing means can, in addition, be adapted to at least one further playback quality of video recordings.

The aforementioned aspects as well as further aspects of the invention will be apparent from the embodiment described hereinafter by way of example and will be elucidated on the basis of this embodiment.

BRIEF DESCRIPTION OF THE DRAWING

The invention will now be described in more detail with reference to an embodiment shown in the drawing and given by way of example, but to which the invention is not limited, in which.

DESCRIPTION OF THE PREFERRED EMBODIMENTS

Figure 1:
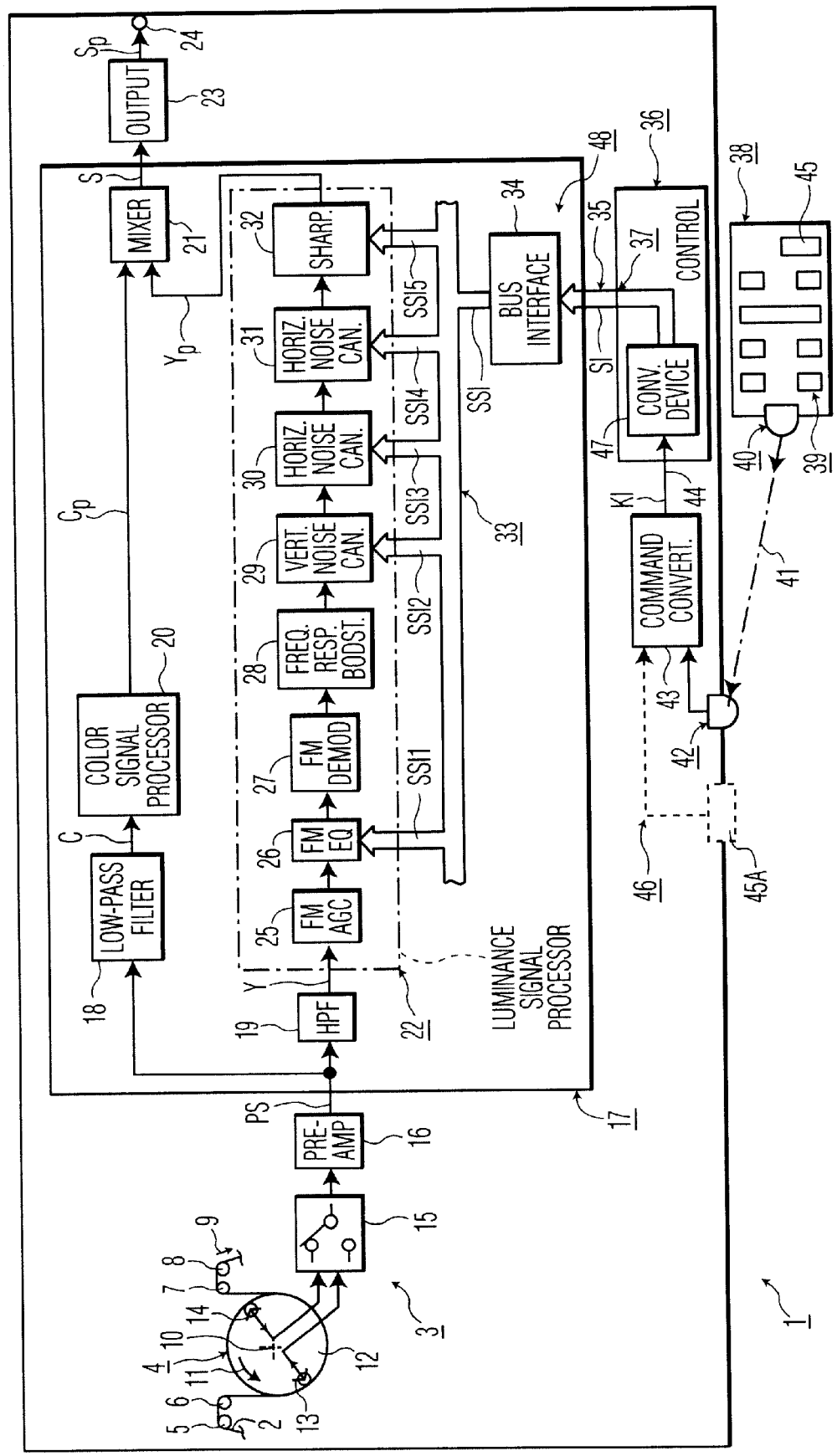
FIG. 1 is a block diagram diagrammatically showing the relevant part of a video recorder in accordance with an embodiment of the invention, which cooperates with entry means for entering characteristic information characterizing different playback qualities of video recordings, this characteristic information being converted into control information with the aid of control means of the video recorder in order to control a plurality of signal-influencing stages.

FIG. 1 shows a video recorder 1 for recording video signals on magnetic tapes and for reproducing recorded video signals from magnetic tapes, but in the present case, only those parts of this video recorder are shown which are relevant for the reproduction of video recordings made on magnetic tapes.

For the reproduction of video recordings recorded on magnetic tapes, these recordings being available with different playback qualities, the video recorder 1 comprises reproduction means 3 for scanning a magnetic tape 2 and for supplying a playback signal PS representing a video recording. In the present case, the reproducing means 3 includes a drum-shaped scanning device 4 around which a magnetic tape 2 is wrapped over an angle of slightly more than 180° by movable tape guides 5, 6 and 7, 8. In a known manner, the magnetic tape 2 is wrapped around the drum-shaped scanning device 4 along a helical path, and during playback, it is driven by tape drive means (not shown) in a transport direction indicated by an arrow 9, this direction corresponding to the so-called normal forward mode.

The drum-shaped scanning device 4 comprises a stationary lower drum section, not shown in FIG. 1, and an upper drum section 12, which is drivable by drive means (not shown) so as to be rotated about a drum axis 10 in the direction indicated by the arrow 11. The upper drum section 12 carries two magnetic heads 13 and 14 which, in a play mode, are driven as indicated by the arrow 11 by the rotationally drivable upper drum section 12, said magnetic heads scanning the magnetic tape 2 along contiguous oblique tracks and thus reproducing a video signal which has been recorded on the magnetic tape 2 and which represents a video recording. It is to be noted that the reproduction of the audio signal associated with the video signal will not be described herein because it is not relevant in the present context.

The reproduction means 3 further comprises a head switching stage 15 having inputs connected to the magnetic heads 13 and 14, and an output connected to a playback-signal preamplifier 16 of the reproduction means 3. By means of the head switching stage 15, the video signal portions scanned by the two magnetic heads 13 and 14 are applied to the playback-signal preamplifier 16 in cyclic succession. On an output, the playback-signal preamplifier 16 produces a playback signal PS representing a video recording. It is to be noted that it is also well known and also possible, in the present video recorder 1, to arranged a separate playback-signal preamplifier after each of the two magnetic heads 13 and 14 and to arrange a head switching stage after the two preamplifiers, a playback signal PS representing a video recording then being produced on the output of this head switching stage.

The video recorder 1 further includes playback-signal processing means 17 for processing the playback signal PS supplied by the playback-signal preamplifier 16. In the present case, the playback-signal processing means 17 is formed by an integrated device, i.e., an IC 17. Such an IC is commercially available, for example, from Sanyo under the type number LA 71525.

In the present case, only the relevant circuit elements of the playback-signal processing means 17 are represented diagrammatically. The playback-signal processing means 17 include a low-pass filter stage 18 and a high-pass filter stage 19 to which the playback signal PS from the playback-signal preamplifier 16 is applied. The low-pass filter stage 18 extracts a color signal C from the playback signal PS. The high-pass filter stage 19 extracts a luminance signal Y from the playback signal PS.

In order to process the color signal C extracted by the low-pass filter stage 18, the playback-signal processing means 17 includes color-signal processing means 20 arranged after the low-pass filter stage 18, for receiving the reproduced extracted color signal C and processing the color signal C, the color-signal processing means then applying a processed color signal $C_p$, to a mixing stage 21.

In order to process the luminance signal Y extracted by the high-pass filter stage 19, the playback-signal processing means 17 includes luminance-signal processing means 22 arranged after the high-pass filter stage 19 and shown, diagrammatically, in dash-dot lines in FIG. 1. The luminance-signal processing means 22 processes the reproduced luminance signal Y and, subsequently, the supplies a processed luminance signal $Y_p$ to the mixing stage 21.

In the mixed stage 21, the processed luminance signal $Y_p$ and the processed color signal $C_p$ are combined to form a sum signal S, which is applied from the mixing stage 21 to an output stage 23 in the video recorder 1 via an output of the playback-signal processing means 17, i.e., via an output of the IC 17. The output stage 23 processes the sum signal S, after which a processed sum signal SP is obtained, which is applied to an output 24 of the video recorder 1, for application to, for example, a TV receiver (TV set), not shown.

The luminance-signal processing means 22 of the playback-signal processing means 17 includes at least one controllable signal-influencing stage for controllably influencing at least a component of the playback signal PS, i.e., in the present case, for controllably influencing the luminance signal Y of the playback signal PS. In the present case, the luminance-signal processing means 22 of the playback-signal processing means 17 includes a plurality of such controllable signal-influencing stages, namely a total of five of such controllable signal-influencing stages, as will now be described in detail.

The playback-signal processing means 17 successively includes the following stages, considered in the direction of signal flow:
1. An FM-AGC stage 25, i.e., a controllable amplifier stage for the automatic gain control of the frequency-modulated luminance signal Y.
2. An FM equalizer stage 26, which is, essentially, a circuit for the level-independent boosting of the lower sidebands with respect to the FM carrier, i.e., a circuit for frequency-response and envelope-delay equalization. The FM equalizer stage 26 represents a first controllable signal-influencing stage for controllably influencing the luminance signal Y.
3. An FM demodulator stage 27, which is a demodulation circuit for demodulating the frequency-modulated luminance signal Y.
4. A frequency-response boosting stage 28, which is, essentially, a circuit for realizing a fixed frequency-response boost. Among experts, the frequency-response boosting stage 28 is also referred to as peaking circuit.
5. A vertical noise-cancellation stage 29, which is, essentially, a circuit for the level-dependent attenuation of high-frequency signal components of the luminance signal Y. The vertical noise-cancellation stage 29 forms a second controllable signal-influencing stage for controllably influencing the luminance signal Y.
6. A first horizontal noise-cancellation stage 30, which is, essentially, a circuit for the level-dependent attenuation of high-frequency signal components of the luminance signal Y, by means of which noise signal components can be reduced. The first horizontal noise-cancellation stage 30 forms a third controllable signal-influencing stage for controllably influencing the luminance signal Y.
7. A second horizontal noise-cancellation stage 31, which is, essentially, a circuit for the level-dependent attenuation of high-frequency signal components. The second horizontal noise-cancellation stage 31 forms a fourth controllable signal-influencing stage for controllably influencing the luminance signal Y.
8. A picture-sharpness control stage 32, which is, essentially, a circuit for the level-independent boosting of signal components in the medium to high frequency ranges, i.e., approximately around 2.0 MHz. The picture-sharpness control stage 32 is a fifth controllable signal-influencing stage for controllably influencing the luminance signal Y.

It is to be noted that some of aforementioned stages 25 to 31 comprise a coil and/or at least a capacitor as frequency-determining elements which are arranged outside the IC, although this is not shown explicitly in FIG. 1. Moreover, it is to be noted that some of the stages 25 to 32 can also be arranged in another sequence.

The playback-signal processing means 17, i.e., the IC 17, includes a bus line 33 in the IC, this bus line having one end connected to a bus interface device 34 and another end connected to the five controllable signal-influencing stages 26, 29, 30, 31 and 32 of the luminance-signal processing means 22. The internal bus line 33 communicates with a bus line 35 external to the IC via the bus interface device 35.

The video recorder 1 further comprises control means 36, which is, essentially, formed by a microcomputer. The control means 36 is connected to the external bus line 35 via bus terminals 37, so that the control means is thus connected to the bus interface device 34 of the playback-signal processing means 27 via the bus line 35.

FIG. 1 further shows a remote control device 38 for remotely controlling the various modes of operation and control functions of the video recorder 1. The remote control device 38 has a keyboard 39 for entering various commands and other information. The remote control device 38 further has an infrared transmitting device 40 for transmitting commands and other information to an infrared receiving device 42 of the video recorder 1 via the transmission path 41 shown as a dash-dot line in FIG. 1. A command converter 43 of the video recorder 1 is connected to the infrared receiving device 42 and generates characteristic information KI, which is, essentially, formed by digital data words and which corresponds to the commands and other information and the like generated by the remote control device 38. The characteristic information KI is applied from the command converter 43 to the control means 36 via a line 44.

In addition to the keyboard 39, the remote control device 38 has a special key 45 which can be provided, for example, with the designation "Menu Controlled Picture" or the designation "Smart Picture". In the present case, the key 45 serves to enter four characteristics in total, which each corresponds to a given playback quality of a video recording. However, such a key 45 can also be provided to enter only two or three or, conversely, more than four, i.e., five or six characteristics. In the present case of four characteristics in total, these include the characteristic "Sharp", the characteristic "Rental", the characteristic "Cartoon" and the characteristic "Usual". Likewise, these characteristics could be "Distinct", "Soft", "Sharp" and "Natural". These characteristics are entered by the key 45 in that, for example, all the four characteristics are shown on a display for a user of the video recorder 1 and the user selects a characteristic by a cursor and subsequently validates the selected characteristic by actuating the key 45 and thus enters it into the video recorder 1. However, entry of the above-mentioned characteristics can also effected, for example, by a different number of actuations of the key 45. Moreover, further alternatives for the entry of the above-mentioned characteristics by the key 45 are conceivable.

Via its infrared transmitting device 40, the transmission path 41 and the infrared receiving device 42 of the video recorder 1, the remote control device 38 transmits information corresponding to one of said four characteristics entered by the key 45 to the command converter 43. Subsequently, the command converter 43 generates characteristic information KI corresponding to the characteristic entered by the key 45. This means that the command converter generates four types of characteristic information KI1, KI2, KI3 and KI4 corresponding to the four above-mentioned characteristics.

As already mentioned hereinbefore, each of the four characteristics "Sharp", "Rental", "Cartoon" and "Usual" designates a given playback quality of a video recording. The characteristic "sharp", for example, characterizes a video recording which exhibits a good resolution and much detail. The characteristic "Rental" characterizes a video recording afflicted with comparatively severe noise and occasional tearing. The characteristic "Cartoon" characterizes a video recording which exhibits little detail, sharp transitions and comparatively large area portions. The characteristic "Usual" characterizes a video recording having a relatively average picture composition.

The remote control device 38, i.e., particularly key 45 for the entry of the aforementioned characteristics, as well as the infrared receiving device 42 and the command converter 43 of the video recorder 1, thus form the entry means 46 which cooperates with the video recorder 1 and which is adapted to enter characteristic information KI—i.e., KI1, KI2, KI3 and KI4 —which characterizes different playback qualities of video recordings.

The entry means 46 then enters first characteristic information KI1 characterizing the playback quality of a video recording being played for the first time or having been played only a few times, second characteristic information KI2 characterizing the playback quality of a video recording having already been played many times, third characteristic information KI3 characterizing the playback quality of a video recording representing an animation film and, in addition, fourth characteristic information KI4 characterizing the playback quality of an average, normal video recording. The first characteristic information KI1 is then generated upon entry of the characteristic "Sharp" by the key 45. The second characteristic information KI2 is generated upon entry of the characteristic "Rental" by the key 45. The third characteristic information KI3 is generated upon entry of the characteristic "Cartoon" by the key 45. The fourth characteristic information KI4 is generated upon entry of the characteristic "Usual" by the key 45.

As already stated hereinbefore, the video recorder 1 comprises the control means 36 formed by a microcomputer. Said characteristic information KI is applied to the control means 36 via the line 44. With the aid of a conversion device 47 realized by the control means 36, the control means converts the characteristic information KI into control information SI corresponding to the characteristic information KI. Accordingly, four types of control information SI1, SI2, SI3 and SI4, corresponding to the characteristic information KI1, KI2, KI3 and KI4, are generated using the conversion means 47 and, consequently, the control means 36. Depending on the control information SI generated by the control means 36, all the controllable signal-influencing stages 26, 28, 29, 31 and 32 are controlled so as to influence the luminance signal Y of the playback signal PS in a controllable manner, as will be described in detail hereinafter.

The control information SI generated by the control means 36 is applied to the bus interface device 34 in the IC 17, i.e., in the playback-signal processing-means 17, via the external bus line 35. The bus interface device 34 is capable of deriving corresponding stage control information SSI from this control information SI. The stage control information SSI thus derived is applied to the five controllable signal-influencing stages 26, 29, 30, 31 and 32 via the internal bus line 33 to control the manner in which they influence the luminance signal Y of the playback signal PS.

Thus, the external bus line 35 and the bus interface device 34 of the IC 17, as well as the internal bus line 33 constitute input means 48, to which the control information SI generated by the control means 36 is applied and by means of which, stage control information SSI, corresponding to the control information SI, is derived from said control information SI, and via which, the stage control information SSI is applied to the signal-influencing stages 26, 29, 30, 31 and 32 in order to control the manner in which they influence the luminance signal Y of the playback signal PS. Each of the five signal-influencing stages 26, 29, 30, 31 and 32 is connected to the control means 36 via the above input means 48, and each of these five signal-influencing stages 26, 29, 30, 31 and 32, receives stage control information SSI via the input means 48, i.e., first stage control information SSI1 to the FM equalizer stage 26, second stage control information SSI2 to the vertical noise-cancellation stage 29, third stage control information SSI3 to the first horizontal noise-cancellation stage 30, fourth stage control information SSI4 to the second horizontal noise-cancellation stage 31,and fifth stage control information SSI5 to the picture-sharpness control stage 32.

When, for the video recorder 1, the characteristic "Sharp" is entered by the key 45 and, accordingly, the input means 46 inputs the characteristic information KI1 into the video recorder 1, the control means 36 generate control information SI1, from which the five types of stage control information SSI1 to SSI5 are generated using the bus interface device 34, which are applied to the five signal-influencing stages 26, 29, 30, 31 and 32 in order to control the manner in which they influence the luminance signal Y of the playback signal PS, and which act to have the following effects in these five signal-influencing stages 26, 29, 30, 31 and 32:

1. FM equalizer stage: strong boost
2. Vertical noise-cancellation stage: inoperative
3. First horizontal noise-cancellation stage: weak attenuation
4. Second horizontal noise-cancellation stage: weak attenuation
5. Picture-sharpness control stage: average though rather stronger boost When, for the video recorder 1, the characteristic "Rental" is entered by the key 45, this likewise results in the following effects in the five signal-influencing stages 26, 29, 30, 31 and 32:

1. FM equalizer stage: weak boost
2. Vertical noise-cancellation stage: strong attenuation
3. First horizontal noise-cancellation stage: strong attenuation
4. Second horizontal noise-cancellation stage: weak attenuation
5. Picture-sharpness control stage: average though rather weaker boost When, for the video recorder 1, the characteristic "Cartoon" is entered by the key 45, this likewise results in the following effects in the five signal-influencing stages 26, 29, 30, 31 and 32:

1. FM equalizer stage: strong boost
2. Vertical noise-cancellation stage: average attenuation
3. First horizontal noise-cancellation stage: weak attenuation 4. Second horizontal noise-cancellation stage: weak attenuation 5. Picture-sharpness control stage: strong boost When, for the video recorder 1, the characteristic "Normal" is entered by the key 45, this likewise results in the following effects in the five signal-influencing stages 26, 29, 30, 31 and 32:

1. FM equalizer stage: average boost
2. Vertical noise-cancellation stage: average attenuation
3. First horizontal noise-cancellation stage: average attenuation
4. Second horizontal noise-cancellation stage: weak attenuation
5. Picture-sharpness control stage: weak boost It is to be noted that, of course, other combinations of effects in the five signal-influencing stages 26, 29, 30, 31 and 32 can be selected.

The basic advantage of the present video recorder 1 resides in the fact that a user of a video recorder 1, by merely selecting an intelligible characteristic for the playback quality of a video recording, can select a response or adaptation of the luminance signal Y of a playback signal PS which is optimum for the selected characteristic for each of the five signal-influencing stages, and thereby achieve an optimum reproduction of video recordings available in different playback qualities.

As is indicated in dash-dot lines in FIG. 1, a key 45A may be provided directly on the video recorder 1 shown in FIG. 1 instead of the key 45 on the remote control device 38. The key 45A performs the same function as the key 45.

The invention is not limited to the embodiment of a video recorder described hereinbefore by way of example. Other embodiments of a video recorder may comprise legs than or more than five signal-influencing stages, which can each be controlled by the entry of a characteristic, or of characteristic information into the video recorder in order to optimize at least a component of a playback signal. Moreover, the measures in accordance with the invention are not limited to the influencing of a luminance signal of a playback signal PS but, within the scope of the invention, it is also possible to influence circuit stages which serve for processing a color signal of the playback signal in a video recorder.

What is claimed is:

1. A video recorder for reproducing video recordings recorded on magnetic tapes, said recordings being available with different playback qualities, said video recorder comprising:

reproduction means for scanning a magnetic tape and for supplying a playback signal representing a video recording;

playback-signal processing means for processing the playback signal, the playback-signal processing means comprising a plurality of controllable signal-influencing stages each controllably influencing at least one component of the playback signal, each of said plurality of controllable signal-influencing stages being controllable in dependence upon a control information;

entry means cooperating with the video recorder for entering characteristic information characterizing different playback qualities of video recordings; and control means arranged to receive the characteristic information, said control means generating the control information corresponding to the characteristic information, wherein said video recorder further comprises input means for receiving the control information generated by the control means and for deriving stage control information corresponding to the control information, said stage control information being applied to each of the plurality of controllable signal-influencing stages for controlling how each controllable signal-influencing stage influences the at least one component of the playback signal, and wherein said plurality of signal-influencing stages comprise an FM equalizer stage, a vertical noise-cancellation stage, a first horizontal noise-cancellation stage, a second horizontal noise-cancellation stage, and a picture-sharpness control stage, each signal-influencing stages receiving stage control information from the input means.

2. The video recorder as claimed in claim 1, plurality of signal-influencing stages are combined in an integrated device, the integrated device being connected to the control means via a bus line forming part of the input means.

3. The video recorder as claimed in claim 1, wherein the entry means enters first characteristic information characterizing the playback quality of a video recording being played for the first time or having been played only a few times, and second characteristic information characterizing the playback quality of a video recording having already been played many times.

4. The video recorder as claimed in claim 3, wherein the entry means, in addition, enters third characteristic information representing the playback quality of a video recording of an animation film.

5. The video recorder as claimed in claim 4, wherein the entry means, in addition, enters at least one further characteristic information.

6. A video recorder for reproducing video recordings recorded on magnetic tapes, said recordings being available with different playback qualities, said video recorder comprising:

reproduction means for scanning a magnetic tape and for supplying a playback signal representing a video recording;

playback-signal processing means for processing the playback signal, said playback-signal processing means including at least one controllable signal-influencing stage for controllably influencing at least one component of the playback signal;

entry means cooperating with the video recorder for entering characteristic information characterizing different playback qualities of video recordings; and control means arranged to receive the characteristic information, said control means generating control information corresponding to the characteristic information, wherein the at least one controllable signal-influencing stage controllably influences said at least one component of the playback signal in dependence upon the control information generated by the control means, wherein:
   the playback-signal processing means comprises a plurality of controllable signal-influencing stages for each controllably influencing at least one component of the playback signal, said plurality of controllable signal-influencing stages including an FM equalizer stage a vertical noise-cancellation stage, a first horizontal noise-cancellation stage, a second horizontal noise-cancellation stage, and a picture-sharpness control stage, and being combined in an integrated device, the video recorder further comprises input means for receiving the control information generated by the control means and for deriving stage control information corresponding to the control information, said stage control information being applied to the plurality of controllable signal-influencing stages via a bus line connecting the integrated device to the control means, said bus line forming a part of said input means, how each of the plurality of controllable signal-influencing stages influences the at least one component of the playback signal, and the entry means enters first characteristic information characterizing the playback quality of a video recording being played for the first time or having been played only a few times, second characteristic information characterizing the playback quality of a video recording having already been played many times, third characteristic information representing the playback quality of a video recording of an animation film, and at least one further characteristic information.

\* \* \* \* \*